July 27, 1926. Re. 16,395

F. J. SPRAGUE

PRESSURE EQUALIZER FOR AIR BRAKE SYSTEMS

Original Filed Dec. 31, 1914

INVENTOR.

BY Frank J. Sprague

Harry Rose

ATTORNEYS.

Reissued July 27, 1926. Re. 16,395

UNITED STATES PATENT OFFICE.

FRANK J. SPRAGUE, OF NEW YORK, N. Y., ASSIGNOR TO SPRAGUE SAFETY CONTROL AND SIGNAL CORPORATION, A CORPORATION OF VIRGINIA.

PRESSURE EQUALIZER FOR AIR-BRAKE SYSTEMS.

Original application filed December 31, 1914, Serial No. 879,939. Divided and application filed June 3, 1925, Serial No. 34,703. Original No. 1,553,295, dated September 8, 1925. Application for reissue filed March 22, 1926. Serial No. 96,658.

This application is filed as a divisional of my prior application filed December 31, 1914, Sr. No. 879,939, for method of an apparatus for control of train movement, and the subject matter hereof forms a part of the apparatus disclosed in the aforesaid prior application, whereby under certain conditions the air pressures, as in the equalizing reservoir and brake pipe, are equalized. In this application such subject matter is disclosed and claimed without reference to the question of automatic train control, in that the invention embodied herein is capable of use independently of the control of standard equipment by automatic means.

In my prior application referred to the automatic brake system upon which my invention is shown as superimposed is the ordinary form embracing what is known as the Westinghouse G—6 engineer's valve, this valve being chosen for simplicity of illustration and without intended limitations. Briefly stated that system comprises the following elements:—

(*a*) One or two main reservoirs carried on the locomotive;

(*b*) A pipe system consisting of air pipes individual to each car and joined continuously from car to car and collectively known as the "brake pipe;"

(*c*) The engineer's valve, with its equalizing piston, equalizing chamber and reservoir and feed valve, connected with the main reservoir and the brake pipe, and controlling the latter, its function depending upon the position of the handle of the valve. The rotary element of the G—6 engineer's valve normally has five positions, namely: "running", the normal position of the valve when the train is running unbraked; "release", the position of the valve for recharging the brake pipe and effecting release of the brakes; "lap", in which all ports in the rotary valve are blanketed, there being no feeding of air from the main reservoir into the brake pipe and no escape of air from the equalizing reservoir; "service", in which air is bled from the brake pipe at a low rate to effect service braking, the valve handle being normally moved from service position to lap position to determine the amount of service braking; and "emergency", in which the brake pipe is freely bled to atmosphere through a large port in the engineer's valve to effect emergency braking;

(*d*) Brake cylinders individual to each car for directly applying the brakes through the foundation gear and braking rigging;

(*e*) Auxiliary reservoirs individual to each car for supplying air to the brake cylinders;

(*f*) Triple valves individual to each car for controlling the brake cylinders in response to changes in the brake pipe pressure;

(*g*) A duplex indicating air gauge for showing the air pressure in the main reservoir and equalizing reservoir;

(*h*) A conductor's valve connected with the brake pipe system which may be opened to atmosphere, producing quasi-emergency braking such as is produced when an air hose in the brake pipe bursts or a train pulls apart.

The movement of air in standard braking equipment such as above outlined under certain conditions may result in a differential of pressure on the two sides of the equalizing piston of the engineer's valve which is detrimental to the action of the system. It is this detrimental action which it is the object of this invention to correct.

Referring to the accompanying drawings in which corresponding parts are designated by corresponding marks of reference:

Figure 1:
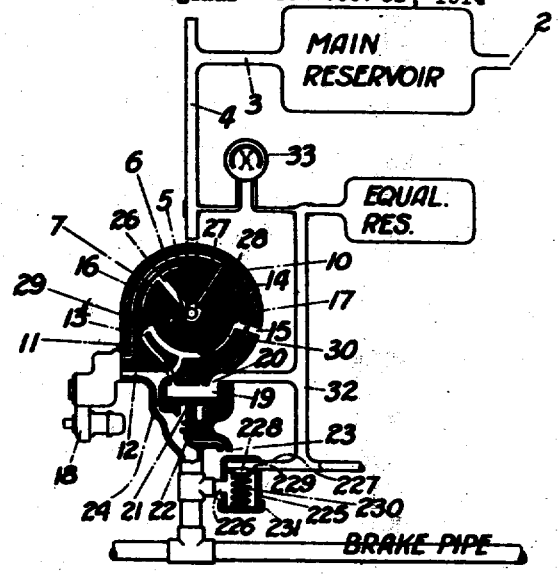
Fig. 1 is a diagrammatic view of an engineer's valve incorporating my invention and showing the valve in running position, the main reservoir, equalizing reservoir, duplex air gauge and feed valve being illustrated.

Referring to Fig. 1, the main reservoir has a pipe connection 2 through which air is delivered into it and compressed therein by an automatically pressure-controlled pump, not shown. On the opposite side of the main reservoir is a pipe connection 3 which leads from the main reservoir into pipe 4, which communicates with a passageway 5 in the engineer's brake valve leading to chamber 6 in the top thereof.

The chamber 6 is shown diagrammatically in the center of the rotary valve 7, and the valve seat is shown surrounding the periphery of the rotary element in place of beneath it, as in the physical embodiment of the valve, the rotary element itself being shown with radiating passages and peripheral cavities in place of the more or less vertical corresponding elements in the physical construction.

The valve body 10 of the engineer's brake valve contains passageways 11, 12, 13 and 14, and an emergency exhaust port 15, all communicating directly with the seat for the rotary valve 7. In this seat also is chamber 16, which has no communication with the atmosphere except through the rotary valve, and a chamber 17, which is in communication with the atmosphere through the emergency exhaust port 15. The passageways 11 and 12 lead respectively to and from a feed valve 18. In the bottom of the engineer's valve is an equalizing piston chamber 19. Passageways 13 and 14 lead to and from this chamber respectively at the top thereof. This chamber also at its top is provided with a port 20, and the bounding walls of the chamber constitute a cylinder within which reciprocates an equalizing piston 21. The equalizing piston carries a service exhaust valve 22 which opens and closes a service exhaust port 23 leading to atmosphere on the one side, and communicating with a passageway 24 leading to the upper side of the equalizing piston 21 and connecting also with the passageway 12 to the valve and to the brake pipe.

The rotary valve 7 has three passageways 26, 27 and 28 radiating from chamber 6, and two cavities 29 and 30 on its periphery. Port 20 is the port by which communication is made between the equalizing piston chamber 19 and an equalizing reservoir by means of a pipe 32.

A duplex air gauge 33, above referred to, is suitably connected with the main reservoir through a branch from pipe 4 and with the equalizing reservoir through a branch from pipe 32.

The rotary valve 7 is manipulated by means of a spindle (not shown) to the top of which is attached the engineer's handle (not shown).

Considering the ordinary practice and operation recited above the five positions of the G—6 engineer's brake valve-running, lap, service, emergency and release, are indicated as follows:

*Running position.*

In Fig. 1 the rotary valve 7 is shown diagrammatically in running position. The passageway 26 of the rotary element registers with the blind chamber 16 and is blanketed. The passageway 28 is also blanketed; but the passageway 27 registers with the passageway 11 in the valve body, and thus permits a flow of air from the main reservoir into the feed valve 18, and thence into the brake pipe through the passageway 12 and 24. The passageway 12 is in communication with the passageway 13 through the cavity 29, thus permitting air from the feed valve to flow into the equalizing piston chamber 19 and thence into the equalizing reservoir. The passageway 14 and the emergency port 15 are both blanketed. The same pressure is then maintained in the equalizing piston chamber and the equaliizng reservoir as in the brake pipe and beneath the equalizing piston 21, and the service exhaust valve 22 is maintained in its downward position, closing the service port 23. No air escapes from the brake pipe and the brakes are free.

*Lap position.*

Figure 2:
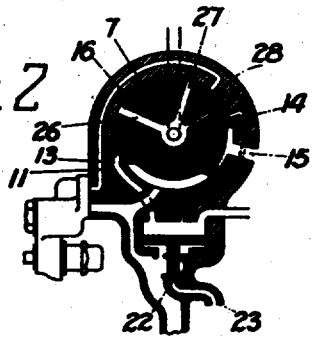
Fig. 2 is a diagrammatic view of the engineer's valve (and feed valve), in lap position.

In Fig. 2 the rotary valve is shown diagrammatically in lap position. The passageway 26 registers only with the blind chamber 16 and is blanketed; the passageways 27 and 28 are both blanketed. The passageways 11, 13 and 14, and the emergency exhaust port 15 are also blanketed. There is, therefore, no flow of air from the main reservoir into the brake pipe or the equalizing piston chamber either directly or through the feed valve, and no flow of air from the equalizing piston chamber. On coming from lap to service position, the service exhaust valve 22, on equalization of pressure due to the drop of pressure in the brake pipe, is moved downward from the position it has at the commencement of the lap position of the engineer's valve by its weight and a slight excess of total pressure of air above the equalizing piston, closing the service exhaust port (see Fig. 2) and after closing, it remains closed as long as lap position is maintained; in coming to lap position from running position the service port 23 is already closed.

*Service position.*

Figure 4:
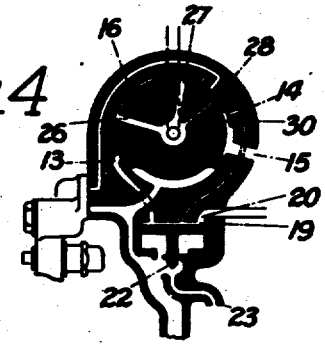

Service position is indicated in Fig. 4, which shows the rotary valve rotated further counter-clockwise until the passageway 14 registers with the cavity 30. The passageway 26 registers with the blind cavity 16 and is still blanketed. The passageways 27 and 28 also remain blanketed. As in lap position, the main reservoir is thus cut off from the feed valve, brake pipe, equalizing piston chamber 19 and the equalizing reservoir. The passageway 13 is also blanketed and since the cavity 30 registers both with the passageway 14 and the emergency port 15, the equalizing piston chamber and the equalizing reservoir are opened to atmosphere. Service position is normally reached from or through lap position, i. e., a position in which service exhaust port 23 is closed.

When the engineer makes a service application, he reduces the pressure in the equalizing reservoir and the equalizing piston chamber by the number of pounds which he wishes to reduce in the brake pipe, which reduction of pressure will be indicated by one of the hands of the duplex air gauge 33, that hand being black in ordinary practice. As the pressure is reduced in the equalizing piston chamber the air pressure in the brake pipe, acting on the under side of the equalizing piston, raises it together with the service exhaust valve 22, and opens the service exhaust port 23 to atmosphere, allowing the air to escape therethrough from the brake pipe. The rapidity with which the equalizing piston is thus raised depends upon the rapidity with which the differential between the pressure on top of the equalizing piston and on the bottom of the equalizing piston is made. So long as the equalizing reservoir and the equalizing piston chamber are open to atmosphere by the rotary valve being maintained in service position the service exhaust port 23 will be held open, provided there is sufficient pressure in the brake pipe to maintain the equalizing piston in its upward position. When the reduction desired in brake pipe pressure has been indicated by the gauge connected with the equalizing piston chamber and the equalizing reservoir the engineer normally moves his handle into lap position. The passageway 14 having been closed by doing so and further escape of air from the equalizing piston chamber and the equalizing reservoir thus prevented, the pressure of the air in the equalizing reservoir will be exerted on the top of the equalizing piston, and as soon as the pressure of air from the brake pipe on the under side of the equalizing piston is reduced to the same pressure as that in the equalizing reservoir, or to a negligible fraction less will force it downward, and the service exhaust valve 22 will close the service exhaust port 23. Therefore, the reduction of air pressure in the equalizing reservoir, primarily made by putting the rotary valve in service position, is a measure of the reduction which subsequently follows in the brake pipe. The time which it will take for this reduction depends upon the amount of opening of the service port and the length of train, that is, the capacity of brake pipe which has to be exhausted and the opening afforded for such exhaust.

*Emergency position.*

Figure 5:
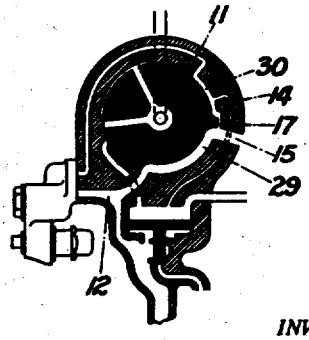

The emergency position of the rotary valve is illustrated in Fig. 5. This is the extreme braking position of the valve, and it is only possible to come to it from or through service position by moving the rotary valve counterclockwise from the latter. This leaves the ports in the rotary valve still blanketed, although in a slightly different position, so that there is still no flow of pressure air into the brake pipe and the main reservoir is not bled. The emergency exhaust port 15 is connected through the cavity 29 with the passageway 12, so that a free passage is open from the brake pipe to atmosphere. The exhaust port 15 is also connected by the chamber 17 and the cavity 30 with the passageways 14 and 11. This results in relieving the pressure on the top of the equalizing piston and prevents a possible jamming of the service exhaust valve.

*Release position.*

Figure 3:
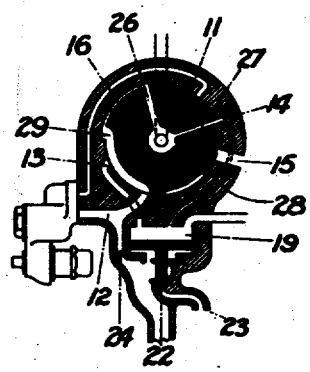
Figs. 3, 4 and 5 are diagrammatic views similar to Fig. 2 showing the engineer's valve in release, service and emergency positions respectively.

The release position of the rotary valve is illustrated in Fig. 3. After the brakes have been applied it is only possible to come to release position from or through running position, by moving the rotary valve clockwise until passageway 11 is blanketed and air from the main reservoir is prevented from flowing into the feed valve; passageway 26 and cavity 29 both register with chamber 16, cavity 29 also registers with passageways 13 and 12, and passageway 27 registers with passageway 14. Air thus flows freely from the main reservoir through passageways 13 and 14 to the equalizing piston chamber 19 and thence to the equalizing reservoir; and through passageways 12 and 24 into the brake pipe, recharging both the equalizing reservoir and the brake pipe. On going to release position the service exhaust port 23 is normally closed by the service exhaust valve 22, as above set forth, and it remains closed, for any differential of pressure which may exist in that position with respect to the equalizing piston is in favor of the top of the piston. The passageway 28 registers with the emergency port 15, and a small amount of air from the main reservoir escapes therethrough with a hissing noise, warning the engineer not to overcharge the system. By watching the black hand of the duplex air gauge the engineer can determine the increasing pressure in the brake pipe system, while retaining the rotary valve in release position, and when the desired pressure is registered return the rotary valve to running position.

It has been pointed out that when the rotary valve was moved to the emergency position a path to free atmosphere was provided from the equalizing chamber 19 and the equalizing reservoir, for the purpose of relieving the equalizing piston from any excess downward pressure which might cause the service exhaust valve 22 to jam or stick. I have provided means which take care of these conditions when certain differential pressures exist on the two sides of the equalizing piston tending to effect this jamming.

These means comprise a relief valve connected between the brake pipe system and the equalizing piston chamber and equalizing reservoir. As illustrated in Fig. 1 the valve body 225 is connected on the one side by a pipe 226 with the riser of the brake pipe, and on the other side by a pipe 227 with the pipe 32 leading to the equalizing piston chamber and reservoir.

The relief valve 228 has a seat of the ordinary form and opens away from the equalizing reservoir, being normally maintained against its seat 229 by a helical spring 230, the tension of which is regulated by a screw cap 231 so formed as to provide a guide for the valve and a seat for the spring. This spring need only be of sufficient strength to keep the valve closed when air pressures are equal on both sides thereof.

The operation of the valve depends on a differential of air pressure on the two sides thereof. Since, in the running position of the engineer's valve, the pressure in the equalizing chamber and reservoir is the same as in the brake pipe, the relief valve 228 will remain closed; and, also, no flow of air will take place through the valve so long as the pressure on the equalizing reservoir side is less than the pressure on the brake pipe side, as is the case both at the moment of beginning manual service and emergency brake applications; nor, obviously, will any flow of air take place while a service application of the brakes is being held.

When the pressure on the brake pipe side of the relief valve is less than that of the equalizing reservoir side, the valve opens and remains until these pressures are nearly equalized. This equalizing of the pressures is parallel in respect to the equalizing piston, and the service exhaust valve is thereby prevented from jamming or sticking. It has been seen that this may occur in release position. It may also occur when the brake pipe is opened externally to the engineer's valve, as, for example, when the conductor's valve is opened or the brake pipe is parted, as above set forth.

It will be noticed that the main reservoir pipe 4 is illustrated as extending upward beyond its junction with the main reservoir, and that there is a pipe extension at the right to the lower end of pipe 32. These extensions have to do with the automatic control system set forth in the aforesaid application Sr. No. 879,939, and may be disregarded and considered closed for the purpose of the present application.

The foregoing detailed description has been given for clearness of understanding, and no undue limitation should be deduced therefrom, but the appended claims should be construed as broadly as possible in view of the prior art.

What I claim as new and desire to secure by Letters Patent is:

1. In an air brake system, the combination of a main reservoir, an equalizing reservoir, a brake pipe, normally closed connecting means between the equalizing reservoir and the brake pipe opened when the pressure in the equalizing reservoir is in excess of that in the brake pipe, a feed valve and means for charging the equalizing reservoir and brake pipe from the main reservoir through the feed valve when the normally closed connecting means is closed.

2. In an air brake system, the combination of a main reservoir, an equalizing reservoir, a brake pipe, a normally closed by-pass between the equalizing reservoir and the brake pipe opened when the pressure in the equalizing reservoir is in excess of that in the brake pipe, a feed valve and means for charging the equalizing reservoir and brake pipe from the main reservoir through the feed valve when the by-pass is closed.

3. In an air brake system, the combination of a main reservoir, an equalizing reservoir, a brake pipe, connecting means between the equalizing reservoir and the brake pipe biased to closed position when the pressures in the equalizing reservoir and brake pipe are equal and opened when the pressure in the equalizing reservoir is in excess of that in the brake pipe, a feed valve and means for charging the equalizing reservoir and brake pipe from the main reservoir through the feed valve when the above specified connecting means is closed.

4. In an air brake system embodying an engineer's valve, the combination with the equalizing piston of that valve, of means for establishing communication between the upper and lower sides of the piston, resilient means operatively associated with the first-named means and permitting the passage of air therethrough when the pressure above the equalizing piston is in excess of that below the equalizing piston, and means for establishing a parallel communication between the upper and lower sides of said piston in the running position of the engineer's valve.

5. In an air brake system embodying an engineer's valve, the combination with the equalizing piston of that valve, of a chamber above the piston and a chamber below the piston, a normally open communication between the two chambers, a by-pass between the two chambers normally closed, and means responsive to air pressure above the piston in excess of that below the piston for permitting air to flow through the by-pass to tend to equalize the pressures above and below the piston, substantially as described.

6. In an air brake system, the combination of a brake pipe, an equalizing reservoir, means for establishing a normally open communication between the brake pipe and equalizing reservoir, an exhaust valve for the brake pipe actuated by a drop of pressure in the equalizing reservoir, and means actuated by a drop of pressure in the brake pipe below the pressure in the equalizing reservoir to reduce the equalizing reservoir pressure.

7. In an air brake system embodying an engineer's valve, the combination of a brake pipe, an equalizing reservoir, means normally connecting the brake pipe with the equalizing reservoir, an exhaust valve for the brake pipe actuated by a drop of air pressure in the equalizing reservoir below that in the brake pipe, and means independent of the engineer's valve for reducing the equalizing reservoir pressure when the brake pipe pressure falls below the equalizing reservoir pressure by a predetermined amount.

Signed at New York, N. Y., this 20th day of March, 1926.

FRANK J. SPRAGUE.